United States Patent Office 3,317,494
Patented May 2, 1967

3,317,494
POLYMERIZATION OF CONJUGATED DIOLEFINS WITH A CARBON DISULFIDE-CONTAINING CATALYST
Frank S. Farson, Akron, Ohio, assignor to The Goodyear Tire & Rubber Company, Akron, Ohio, a corporation of Ohio
No Drawing. Filed June 12, 1964, Ser. No. 374,840
22 Claims. (Cl. 260—82.1)

This invention relates to the polymerization of conjugated diolefins. More particularly it relates to the polymerization of conjugated diolefins and mixtures thereof by an improved catalyst system. Most particularly it relates to a process for the polymerization of conjugated diolefins by means of this improved catalyst system to produce polymers containing a high degree of stereo regularity.

It has been discovered that certain synthetic polymers, which contain a high degree of stereo regularity, exhibit certain desirable physical and chemical properties. Thus, in recent years many efforts have been made to control the spatial arrangement of synthetic monomers during their polymerization in order to form synthetic polymers which contain a high degree of stereo regularity. It is known that certain organo metallic compounds, when combined with certain transition metal compounds, will produce catalysts which, when employed to polymerize conjugated diolefins, will produce polymers having an ordered spatial arrangement of the molecules contained therein. These polymers are known as stereospecific polymers. It is known, for instance, that aluminum trialkyls such as aluminum triethyl, aluminum triisobutyl and the like, when reacted with titanium tetrachloride, will produce catalysts which, when used to polymerize conjugated diolefins, will cause the formation of polymers which contain a high degree of stereospecificity. It is also known that aluminum trialkyl etherates of aromatic ethers such as aluminum triisobutyl diphenyl etherate, aluminum triethyl anisolate and the like, when reacted with titanium tetrachloride, will produce a catalyst which, when used to polymerize conjugated diolefins, will cause the formation of polymers which contain a high degree of stereospecificity. Thus, certain of these processes are able to produce synthetic polymers which have physical and chemical characteristics similar to natural rubber. Other of these processes produce polymers from conjugated diolefins which exhibit a high degree of 1,4 addition of the monomeric units contained therein.

However, certain of these aforementioned polymerization processes are subject to various deficiencies. One of the most serious deficiencies is the formation of undesirable by-products during the polymerization. Another deficiency encountered is that the catalyst composition requirements to achieve a high degree of stereospecificity in the product are very stringent. If these rather stringent catalyst composition requirements are not rigidly adhered to, the products are obtained in a very low yield for a given amount of catalyst and, further, the products that are obtained contain very large amounts of deleterious by-products. Still another deficiency found in these prior processes is that the stereospecificity of the products is often too low to be considered of commercial value.

Therefore, it is an object of this invention to provide a process which will produce synthetic polymers from conjugated diolefins exhibiting a high degree of stereospecificity and at the same time essentially free of undesirable by-products. Another objective is to reduce the rather stringent requirements of catalyst compositions which are needed for polymerization processes to produce good yields of polymers exhibiting high stereospecificity. Another objective is to broaden the region of polymerization temperatures suitable to produce synthetic rubbers containing very little, if any, undesirable by-products. It is a further object of this invention to provide a catalyst system whereby conjugated diolefins may be polymerized to polymers exhibiting a greater degree of specificity than heretofore known. A more specific object of this invention is to provide a method for the polymerization of isoprene to form a polyisoprene exhibiting a high degree of cis 1,4 addition which at the same time has certain physical and chemical properties superior to that of natural rubber. Additional objects will appear as the description proceeds.

In the preceding paragraphs reference has been made to the terms "high degree of specificity," "unwanted by-products," and the like. These unwanted by-products which effect the degree of specificity are extractable from the rubber in certain selected solvents. It has been determined that by employing the prior art processes that the polymers formed contain considerable amounts of a material which is polymeric in nature and is soluble in a 1/1 volume ratio of isopropyl alcohol/hexene mixture. It has been further determined that this material which is extractable from these polymers are low molecular weight polymeric materials which contain substantial amounts of compounds of cyclic structures. It is believed that it is this extractable low molecular weight cyclic material which causes the catalyst of the prior art to yield polymers which do not contain extremely high stereospecificity. It is believed that these low molecular weight cyclic materials account for a certain deficiency in the physical and chemical characteristics of these prior art polymers.

The conjugated diolefins to which this invention is directed are diolefins such as butadiene-1,3 and the 2-alkyl-substituted butadienes wherein the alky radical in the 2 position contains from 1 to about 8 carbon atoms. Representative of these 2-alkyl-1,3-butadienes are 2-methyl-1,3-butadiene, more generally known as isoprene; 2-ethyl-1,3-butadiene; 2-propyl-1,3-butadiene; 2-isopropyl-1,3-butadiene; 2-butyl-1,3-butadiene; 2-isobutyl-1,3-butadiene; 2-amyl-1,3-butadiene; 2-isoamyl-1,3-butadiene; 2-hexyl-1,3-butadiene; 2-cyclohexyl-1,3-butadiene; 2-isohexyl-1,3-butadiene; 2-heptyl-1,3-butadiene; 2-isoheptyl-1,3-butadiene 2-octyl-1,3-butadiene and 2-iso-octyl-1,3-butadiene. Mixtures of these diolefins may also be employed.

It has been discovered that the objects of this invention may be accomplished by polymerizing at least one conjugated diolefin by means of a catalyst system comprising (A) titanium tetrachloride (B) at least one member of the group of (1) the organo aluminum compounds of the formula

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyls), aryl and aralkyl radicals and (2) the aromatic etherates of organo aluminum compounds of the formula

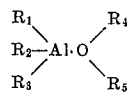

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyl), aryl, aralkyl radicals; $R_4$ is an aromatic radical and $R_5$ is selected from the group consisting of saturated aliphatic, unsaturated aliphatic, saturated alicyclic, unsaturated alicyclic and aromatic radicals and (C) carbon disulfide.

The organo aluminum compounds which form an important part of the catalyst employed in this invention may be defined by the formula set forth below. It is also to be realized that the same organo aluminum compounds which may be used as one component of the catalyst (along with titanium tetrachloride and carbon disulfide) are also employed to prepare the aromatic etherates of organo aluminum compounds which may also be one of the catalyst components. It should be noted in the formulae above that the organo aluminum portion of the organo aluminum aromatic etherates are the same as the organo aluminum compounds. These organo aluminum compounds may be defined by the formula

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyls), aryl and aralkyl radicals. Mixtures of these organo aluminum compounds may also be used and mixtures may also be used to prepare the organo aluminum aromatic etherates. Representative and by no means limiting of such organo aluminum compounds are: dimethyl aluminum chloride, diethyl aluminum chloride, di-n-propyl aluminum chloride, di-n-butyl aluminum chloride, diisobutyl aluminum chloride, dihexyl aluminum chloride, dioctyl aluminum chloride, diphenyl aluminum chloride, dioctyl aluminum bromide, di-n-propyl aluminum bromide, di-n-butyl aluminum bromide, diisobutyl aluminum bromide, diethyl aluminum iodide, di-n-propyl aluminum iodide, di-n-butyl aluminum iodide, diisobutyl aluminum iodide and other organo aluminum halides. Also included are diethyl aluminum hydride, di-n-propyl aluminum hydride, di-n-butyl aluminum hydride, diisobutyl aluminum hydride, diphenyl aluminum hydride, di-p-tolyl aluminum hydride, di-benzyl aluminum hydride, phenyl ethyl aluminum hydride, phenyl n-propyl aluminum hydride, p-tolyl ethyl aluminum hydride, p-tolyl n-propyl aluminum hydride, p-tolyl isopropyl alumium hydride, benzyl ethyl aluminum hydride, benzyl n-propyl aluminum hydride, benzyl isopropyl aluminum hydride and other organo aluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorgano aluminum compounds.

The aromatic ethers which form a part of the aromatic etherates of organo aluminum compound which, along with titanium tetrachloride and carbon disulfide, comprise the catalyst of this invention may be defined by the formula $$R_4\text{—O—}R_5$$

wherein $R_4$ is an aromatic radical and $R_5$ is selected from the group consisting of saturated aliphatic, unsaturated aliphatic, saturated alicyclic, unsaturated alicyclic and aromatic radicals. The term aromatic radical is intended to include both phenyl and naphthyl as well as substituted phenyl and naphthyl radicals. Mixtures of these ethers may also be used to prepare the organo aluminum aromatic etherates. Representative of and by no means limiting such ethers are: phenyl ether, naphthyl ether, anisole, phenetole, paramethyl anisole, methyl tolyl ether, cyclohexyl phenyl ether, cyclo- hexyl naphthyl ether, amyl phenyl ether, butyl phenyl ether, vinyl phenyl ether, allyl phenyl ether, allyl tolyl ether, butyl tolyl ether, alpha and beta naphthyl methyl ethers, alpha and beta naphthyl ethyl ethers, cyclohexenyl phenyl ether, biphenyl ether, bis ethylphenyl ether, p-phenyl anisole, tolyl and xylyl ethers, para chloro anisole, parafluoro anisole, bis chlorophenyl ether and bis fluorophenyl ether may also be used.

The substituted aromatic ethers may also be employed so long as the substituents do not, themselves, react or interfere in a manner to destroy, weaken or affect catalyst activity. Representative of such inert substituents are alkyl and aryl radicals and other organic and inorganic radicals which are known to be inert when substituted for the hydrogens of the aromatic ethers.

The aromatic ethers employed in this invention may contain more than one etheral oxygen. When the particular aromatic ether used does contain more than one etheral oxygen atom, the amount of the organo aluminum compound and the amount of aromatic ether used should be based on the C—O—C groups contained in the particular aromatic ether rather than on the equal molar amount suggested elsewhere herein. This is believed to be due to the fact that each etheral oxygen atom will form a bond to the aluminum of the organo aluminum compound. Therefore, to form an organo aluminum etherate of an ether with more than one ether linkage the amounts used are dependent directly on the ethereal oxygen and aluminum atoms rather than the molecular weights of the materials employed.

The organo aluminum etherates of aromatic ethers which are one component of the catalysts of this invention may be prepared by conventional procedures. These organo aluminum etherates of aromatic ethers may be prepared by directly reacting an aluminum magnesium alloy with an alkyl bromide in the presence of the particular aromatic ether. These procedures are straight forward and well known. Other methods of preparing these organo aluminum aromatic etherates may also be employed. One convenient method is to mix approximately equal molar quantities of the desired aromatic ether with the desired organo aluminum compound. When prepared in this manner the compounds are usually dissolved in an inert hydrocarbon solvent (a term more fully described below) for ease of handling and accurate measurement. Therefore, for convenience, the final organo aluminum aromatic etherate is usually employed as solution in an inert hydrocarbon solvent.

Representative examples of the organo aluminum etherates of aromatic ethers which are useful in this invention are the aromatic etherates of organo aluminum compounds such as those formed by combining the heretofore recited organo aluminum compounds and the heretofore recited aromatic ethers such as diisobutyl aluminum chloride diphenyl etherate, triisobutyl aluminum diphenyl etherate, dihexyl aluminum diphenyl etherate, dihexyl aluminum anisolate, and various other aromatic etherates of organo aluminum compounds which would be formed by reaction of the recited aromatic ethers with the recited organo aluminum compounds.

Titanium tetrachloride, which is combined with the organo aluminum aromatic etherates and/or organo aluminum compounds and carbon disulfide to form the catalysts of this invention does not require any particular discussion. It should, of course, be anhydrous and as pure as possible, the reason being that moisture has—and other impurities may have—a deleterious effect on the finished catalysts.

The carbon disulfide used in the catalyst of this invention does not require any particular discussion. It, too, should be anhydrous and as pure as possible, since moisture is, and other impurities may be, injurious to the catalysts.

In general the conjugated diolefins employed in the practice of this invention are polymerized in the presence of the aforementioned catalyst system while these monomers are dissolved in an inert diluent or solvent. By the terms inert diluent or solvent—whenever employed in this application—is meant that the solvent or diluent does not enter into the structure of the resulting polymer, does not adversely affect the properties of the resulting polymer nor does it have any adverse effect on the activity of the finished catalyst or the components from which the catalyst is prepared. Usually the inert solvents or diluents useful for this purpose are organic hydrocarbons, representative of which but not limiting are: paraffinic hydrocarbons such as pentane, hexane, heptane, octane and isooctane; the acyclic hydrocarbons such as cyclohexane and the like and the aromatic hydrocarbons such as benzene, toluene and xylene. Mixtures of any of these hydrocarbons may also be employed. Substituted hydrocarbons may also be employed so long as the substituents are themselves inert under the conditions of the polymerization. Representative of such substituents are alkyl and aryl radicals and other organic and inorganic substituents which are known to be inert when attached to aromatic rings.

The solvent/monomer volume ratios employed have not been found to be critical and may be varied over comparatively wide ranges. For instance up to 20 or more/1 volume ratio of solvent to monomer can be employed. Usually it is preferred to utilize a solvent/monomer volume ratio of about 3 to 6/1. The polymerizations to which this invention is directed may also be carried out in the absence of inert solvents or diluents. This technique is known as bulk or mass polymerization which practice is well known to the art. Continuous polymerization processes may also be employed.

In conducting the polymerizations of this invention, it is usually desirable to employ air-free and moisture-free techniques. The complex catalysts prepared from organoaluminum compounds and/or organo-aluminum aromatic etherates, titanium tetrachloride and carbon disulfide are somewhat sensitive to the effects of oxygen and moisture, these materials being detrimental to catalyst activity and in some cases to the polymer formed. These techniques, however, are well known in the polymerization art and, therefore, will not be discussed here in great detail.

The temperatures employed during the polymerizations of this invention may vary broadly between temperatures of −30° C. or lower up to 90° C. or higher and thus are not critical. It has usually been the practice, however, to employ more convenient temperatures ranging from about −10° C. to about 80° C.

As is stated above the catalyst of this invention is a mixture of organo aluminum compounds and/or organo aluminum etherates of aromatic ethers, titanium tetrachloride and carbon disulfide. The mol ratio of the various components in this invention may vary over a wide range. For instance, in the polymerization of butadiene-1,3 the alumina to titanium mol ratio (Al/ti) has been varied successfully from about 0.7/1 to at least about 7/1. However, for economy's sake, it is deemed preferred to vary this ratio only from about 0.7/1 to about 4/1. In the polymerization of the 2-alkyl substituted butadienes the Al/Ti mol ratio can be varied from about 0.6/1 to about 2/1. However, a more preferred range of from about 0.7/1 to about 1.3/1 is usually employed.

The amount of carbon disulfide which is employed in the catalyst of this invention has not been found to be too critical. Of course, sufficient carbon disulfide should be employed to obtain the beneficial effects therefrom. This lower limit has been found to be about 0.01/1 calculated as the mol ratio of carbon disulfide to aluminum ($CS_2$/Al). A more optimum ratio appears to be between about 0.05/1 and about 0.2/1. While the benefits derived from the addition of the indicated small amount of carbon disulfide to the aluminum-titanium catalyst, the maximum amount or upper limit of the amount of carbon disulfide appears to vary with the Al/Ti mol ratio employed. For instance, at a mol ratio of Al/Ti of 2.0/1 there appears to be little benefit derived when more than about 0.4/1 $CS_2$/Al is used. At an Al/Ti mol ratio of 1.5/1, little, if any, benefit is derived when more than about 1.0/1.0 $CS_2$/Al is employed. At a mol ratio of Al/Ti of approximately 1/1 the optimum amount of carbon disulfide appears to be around 0.05/1 to 1.0/1 $CS_2$/Al but the ratio beyond which no further added benefits are obtained seems to be about 5/1 $CS_2$/Ti. Therefore, the upper limit of the $CS_2$ employed to derive a benefit varies, however, those skilled in this art will be able to determine this with little effort.

The actual catalyst in this invention may be prepared in most any manner. That is to say, the three components may be combined in any manner. The mixing may take place while the materials are in the presence or the absence of the monomer to be polymerized. It has usually been the practice to mix the aluminum and titanium components in the absence of the monomer and to add the carbon disulfide to the mixture of the monomer and the inert solvent in the polymerization vessel and subsequently add the preformed aluminum-titanium component of the catalyst. The $CS_2$ may also be added to the mixed aluminum and titanium components prior to their being added to the polymerization vessel.

The temperature at which the catalysts are prepared may vary over wide extremes such as −40° C. to +60° C. and therefore are not critical.

The amount of catalyst employed, of course, depends on a number of factors such as the polymerization rate and the molecular weight desired, the polymerization temperature and other such factors as the concentration of the monomer in the solvent and the purity of the overall system. Obviously a sufficient amount of catalyst must be employed to cause polymerization but there is no theoretical upper limit. Thus the amounts of catalysts may vary widely depending on these factors. It has been found, however, that a practical catalyst concentration is one which will vary broadly from about 0.01 to about 3 or 4 parts by weight calculated as titanium tetrachloride originally employed to prepare the catalyst per 100 parts by weight of the monomer (p.h.m.) which is to be polymerized. A more preferred range of catalyst concentration which varies from about 0.05 to less than 1.0 p.h.m. of $TiCl_4$ originally employed to prepare the catalyst is usually employed in the polymerizations. These preferred amounts of catalyst in terms of mols of titanium are equivalent to about 0.26 to about 5.3 millimoles per 100 grams of monomers.

The practice of this invention is further illustrated by reference to the following examples which are intended to be representative rather than restrictive of the scope of this invention.

EXAMPLE I

In this example a series of experiments were performed employing catalysts prepared from aluminum triisobutyl phenyl etherate/titanium tetrachloride at an Al/Ti mole ratio of 0.9/1 in which varying amounts of carbon disulfide were employed. The aluminum triisobutyl phenyl etherate was prepared by reacting equal molar quantities of aluminum triisobutyl and phenyl ether to give a two molar solution of aluminum triisobutyl phenyl etherate in heptane. Sufficient amount of this etherate solution was added to 0.4 molar solution of titanium tetrachloride in heptane to give a catalyst of 0.9/1 Al/Ti mole ratio.

To a number of 4 ounce polymerization vessels which contained 10 grams of isoprene and 40 grams of pentane was added carbon disulfide to provide the various $CS_2$/Al ratios listed in the table which follows. Sufficient aluminum triisobutyl phenyl etherate/titanium tetrachloride mixture was added to each of these bottles to give 1.32 millimoles of titanium (as originally used) per 100 grams of monomer (p.h.m.). These isoprene samples were allowed to polymerize with agitation at 50° C. for 1 hour at which time they were stopped by adding a 2½ percent solution of ditertiary amyl hydroquinone in isopropyl alcohol. The yields of solid rubber were obtained from the weights of the residues obtained after a partial evaporation and further extraction with a 50/50 volume isopropyl alcohol/hexane mixture and drying to a constant weight in a vacuum. The percent yields, the cis content, the gel content of the solid portion of the polymer and the dilute solution viscosity (DSV) were determined in a conventional manner. The results are given in the table below in which column 1 is the run number, column 2 is the $CS_2/Al$ mole ratio, column 3 is the percent yield obtained, column 4 is the cis-1,4 content in percent, column 5 is the percent gel and column 6 is the dilute solution viscosity (DSV).

TABLE 1

| 1 Run No. | 2 $CS_2/Al$ | 3 Percent Solid | 4 Percent Cis Content | 5 Percent Gel Content | 6 DSV |
|---|---|---|---|---|---|
| 1 | 0 | 75 | 97.0 | 14 | 3.93 |
| 2 | 0.06 | 83 | ND | 14 | 3.75 |
| 3 | 0.17 | 84 | 97.1 | 13 | 3.88 |
| 4 | 0.33 | 80 | 97.1 | ND | 4.24 |
| 5 | 0.55 | 79 | ND | ND | ND |
| 6 | 1.66 | 78 | 96.7 | ND | 4.25 |

ND = Not Determined.

EXAMPLE II

In this example a series of experiments were conducted in the same manner as in Example I except that the Al/Ti ratio in the preformed catalyst was 1.5/1 instead of 0.9/1 and the polymerization time was 24 hours instead of 1 hour. The results are given in the table below in which the headings are the same as that in Table 1 except that column 7 shows the percent extractables formed.

TABLE 2

| 1 Run No. | 2 $CS_2/Al$ | 3 Percent Solid | 4 Percent Cis Content | 5 Percent Gel Content | 6 DSV | 7 Percent Extract.* |
|---|---|---|---|---|---|---|
| 1 | 0 | 34 | | 4 | 4.48 | 31 |
| 2 | 0.04 | 76 | 96.5 | 3 | 4.31 | 0 |
| 3 | 0.17 | 73 | 94.6 | 8 | 4.41 | 0 |
| 4 | 0.66 | 41 | 94.9 | 5 | 5.00 | 0 |
| 5 | 1.66 | 24 | 94.6 | 7 | 4.98 | 0 |

*The term extractables are defined as the portion of the polymerization products which are soluble in a 50/50 by volume isopropyl alcohol/hexane mixture. The percentage extractables is calculated as the amount of extractables portion based on total monomer employed in the polymerizations.

EXAMPLE III

In this example a series of experiments were conducted in the same manner as in Example II except the Al/Ti ratio was 2.0/1 instead of 0.9/1. The results are given in the table below in which the headings are the same as that in Table 2.

TABLE 3

| 1 Run No. | 2 $CS_2/Al$ | 3 Percent Solid | 4 Percent Cis Content | 5 Percent Gel Content | 6 DSV | 7 Percent Extract.* |
|---|---|---|---|---|---|---|
| 1 | 0 | 13 | | 18 | 4.27 | 54 |
| 2 | 0.03 | 43 | | 10 | 4.31 | 0 |
| 3 | 0.13 | 28 | | 3 | 4.96 | 0 |

*See footnote at end of Table II.

EXAMPLE IV

In this example is illustrated the polymerization of isoprene in accordance with this invention on a larger scale and also is illustrated the vulcanization properties of the polymers prepared by the prior art process and by the process of this invention. Catalysts were prepared in a manner similar to that of Example I except that the Al/Ti mol ratio was 0.85/1. To a five gallon polymerization vessel containing 20% isoprene by weight solution in pentane was added sufficient carbon disulfide to give a $CS_2/Al$ mol ratio of 1.83/1. Sufficient amount of the preformed aluminum titanium catalyst was added to this polymerization vessel to give a catalyst level of 0.16 p.h.m. of Ti (original). Polymerizations were conducted at 50° C. for 3 hours.

A second 5 gallon polymerization identical to the one described above except that *no carbon disulfied* was employed, and this polymerization resulted in a conversion of 68.3% of a polymer having a DSV of 4.69 and 2.6% of low molecular weight extractables.

The polymerization which contained the carbon disulfide had a conversion of 63.3% of a polymer having a DSV of 5.4 and only 0.45% low molecular weight extractables. Thus, is illustrated that this invention results in a reduction of more than five fold in the amount of low molecular weight extractable material produced over the extractable material produced by the prior art process.

The two polyisoprenes prepared above and natural rubber were compounded according to the following formulation:

| | Parts |
|---|---|
| Rubber | 100 |
| Carbon black (HAF) | 25 |
| Rosin acid softener | 3.0 |
| Antioxidant | 1.0 |
| Stearic acid | 2.0 |
| Zinc oxide | 3.0 |
| Santocure NS | 0.8 |
| Sulphur | 2.0 |

The cured physical properties of natural rubber, the polymer containing no carbon disulfied and the polymer containing sufficient carbon disulfide to give $CS_2/Al$ mol ratio of 1.83/1 are given in the table below. The vulcanization temperature and time was, in the case of the natural rubber, 275° F. and 40 minutes; the two synthetic polyisoprenes less 275° F. and 20 minutes.

TABLE 4

| | Property Tested | | |
|---|---|---|---|
| | Avg. Nat. Rubber Controls | No $CS_2$ | $CS_2/Al$ 1.83/1 |
| Ultimate Tensile | 4,270 | 4,450 | 4,450 |
| Elongation | 635 | 740 | 690 |
| 300% Modulus | 1,000 | 725 | 900 |
| Rebounds, Cold | 83.2 | 85.4 | 85.4 |
| Rebounds, Hot | 88.4 | 90.2 | 91.3 |
| Dynamic Modulus | 45.9 | 46.8 | 51.1 |
| Internal Friction | 6.3 | 5.0 | 4.9 |
| Dynamic Resilience | 72.0 | 77.1 | 79.1 |
| Heat Rise, Hx | 33.6 | 27 | 28 |
| Heat Rise, Hf | 71.6 | 56 | 47 |

EXAMPLE V

In this example, three 5 gallon polymerizations were run employing aluminum triisobutyl diphenyl etherate/titanium tetrachloride catalysts at a mole ratio of Al/Ti of 0.85/1. In one of these polymerizations no carbon disulfide was employed. In the second carbon disulfide was employed in sufficient amount to give a $CS_2/Al$ mole ratio of 0.5/1 and in the third sufficient carbon disulfide was employed to give a CS/Al mole ratio of 2.3/1. Polymerizations were conducted in the manner similar to that of Example IV except that the polymerization temperature was 70° C. and the catalyst levels and reaction times varied somewhat. The results of these three polymerizations are given in the table below.

TABLE 5

|  | Mol Ratio of CS$_2$/Aluminum | | |
|---|---|---|---|
|  | 2.3/1.0 | No CS$_2$ | 0.5/1.0 |
| Catalyst Level (p.h.m.) | 0.2 | 0.2 | 0.2 |
| Polymerization Temp., °C | 70 | 70 | 70 |
| Polymerization Time, hours | 18½ | 18½ | 7 |
| Percent Conversion | 43.9 | 76.0 | 66.9 |
| D.S.V. (0.05 grams/50 mls.) | 4.85 | 3.62 | 4.27 |
| Percent Extractables | 0.9 | 17.6 | 1.4 |
| Cis-1,4 Content (percent) | 94.5 | 96.6 | 96.6 |

TABLE 5A

|  | Property Tested | | |
|---|---|---|---|
|  | CS$_2$/Al 2.3/1 | No CS$_2$ Control | CS$_2$/Al 0.5/1 |
| Ultimate Tensile | 4,450 | 3,700 | 4,175 |
| Elongation | 735 | 800 | 680 |
| 300% Modulus | 750 | 400 | 625 |
| Hot Tensile (200° F.) | 2,875 | 2,615 | 3,315 |
| Rebounds, Cold | 83.6 | 77.6 | 85.4 |
| Rebounds, Hot | 88.4 | 84.2 | 88.4 |
| Dynamic Modulus | 50.1 | 31.7 | 49.6 |
| Internal Friction | 6.5 | 7.1 | 5.8 |
| Dynamic Resilience | 73.2 | 58.3 | 75.5 |
| Heat Rise, Hx | 34 | 35 | 31 |
| Heat Rise, Hf | 62 | 151 | 56 |
| Percent Aged Tensile Retention | 73.2 | 27.0 | 75.5 |

Samples of each of the polyisoprenes produced in these three runs were compounded in the identical formula as that employed in Example IV. The physical properties of these polyisoprenes which were cured at 275° F. for 20 minutes are set forth in the table above.

EXAMPLE VI

In this example the catalysts were prepared from aluminum triisobutyl phenyl etherate and titanium tetrachloride by mixing sufficient of each of the components to form mixtures having an Al/Ti mole ratio of 0.9/1 and 1.3/1. To this mixture was added sufficient CS$_2$ as to result in catalysts having a CS$_2$/Al mole ratio of 0.1/1. These catalysts in an amount of 0.25 p.h.m. of Ti were then employed to polymerize 10 grams of isoprene dissolved in 40 grams of pentane. The polymerization temperature was 50° C., the polymerization times are given in the table below. Controls were run employing only the aluminum and titanium components of the catalysts and no CS$_2$ was added.

The yield and the percent extractables were obtained in the manner of Example I and are reported in the table below in which column 1 is the run number, column 2 is the Al/Ti mole ratio, column 3 is the polymerization time, column 4 is the percent yield of the control experiments, column 5 is the percent extractable of the control experiments, column 6 is the percent solid yield of the experiments containing carbon disulfide, column 7 is the percent extractables of the samples containing carbon disulfide.

TABLE 6.—EFFECT ON YIELD OF CS$_2$ ADDED TO CATALYST

| Run No. | Al/Ti | Pzn Time | No CS$_2$ | | With CS$_2$ | |
|---|---|---|---|---|---|---|
|  |  |  | Percent Solid | Percent Extractables | Percent Solid | Percent Extractables |
| 1 | 0.9 | 60 min | 67 | 0 | 75 | 0 |
| 2 | 0.9 | 150 min | 76 | 0 | 83 | 0 |
| 3 | 0.9 | 22 hr | 90 | 0 | 92 | 0 |
| 4 | 1.3 | 150 min | 6 | 16 | 42 | 0 |
| 5 | 1.3 | 22 hr | 9 | 58 | 91 | 1 |

EXAMPLE VII

In this example is illustrated the practice of this invention in the polymerization of butadiene using organo aluminum etherates in the catalysts. Aluminum triisobutyl phenyl etherate was prepared by reacting equal molar quantities of phenyl etherate with aluminum triisobutyl in a manner similar to Experiment 1.

Preformed catalysts of a molar ratio of Al/Ti of 0.9/1 were prepared in a manner similar to that of Example I. These catalysts in an amount of 0.31 and 0.62 p.h.m. of Ti were employed to polymerize 10 grams of butadiene-1,3 in 100 milliliters of benzene solution at 50° C. for 18 hrs. The amounts of catalysts which were employed are listed in the table below. The results are set forth in the table below wherein column 1 is the run no., column 2 is the amount of catalyst employed, column 3 is the carbon disulfide/aluminum mole ratio, column 4 is the Al/Ti mole ratio, column 5 is the percent yield of polymer obtained, column 6 is the dilute solution viscosity (DSV), column 7 is the percent gel content in the polymer and column 8 is the percent of extractables found in the polymer.

TABLE 7

| Run No. | Amt. of Cat. | CS$_2$/Al | Al/Ti | Percent Yield | DSV | Percent Gel | Percent Extract. |
|---|---|---|---|---|---|---|---|
| 1 | 0.6 | 0 | 0.9 | 62 | 4.7 | 25 | 1.5 |
| 2 | 1.2 | 0 | 0.9 | 78 | 2.6 | 68 | 2.0 |
| 3 | 0.6 | 0.51 | 0.9 | 73 | 5.4 | 19 | 0.5 |
| 4 | 1.2 | 0.034 | 0.9 | 94 | 2.7 | 74 | 0.9 |

EXAMPLE VIII

In this it is illustrated the practice of this invention in the polymerization of butadiene.

Sufficient aluminum triisobutyl and titanium tetrachloride were added to 10 grams of butadiene in 100 milliliters of benzene in solution to give a catalyst having an Al/Ti mole ratio of 1.5 and a total catalyst amount of 0.4 p.h.m. of Ti. To one of these polymerizations no carbon disulfide was added. To the other sufficient carbon disulfide was added to give a CS$_2$/Al ratio of 0.2/1. These polymerizations were allowed to react at 50° C. for 18 hours.

The polymerization containing no carbon disulfide resulted in a 47% yield of a polymer having a DSV of 1.9, a gel content of 24% and this polymer contained 2.7% extractables.

The polymerization containing the carbon disulfide resulted in an 81% yield of a polymer having a DSV of 2.4%, a gel content of 64% and this polymer contained only 0.9% extractables.

EXAMPLE IX

In this example a 10 gallon polymerization was employed. A catalyst was prepared with an Al/Ti mole ratio of 1.25/1 in a manner similar to that of Example I. Sufficient amount of this catalyst was employed to polymerize 20% isoprene in heptane in a 10 gallon reaction vessel so that the catalyst level was 0.34 p.h.m. of Ti. Sufficient carbon disulfide was added to give a CS$_2$/Al mole ratio of 0.075/1. This polymerization was allowed to react for 8⅓ hours at 51° C. This resulted in a conversion of 73.5% of a polyisoprene having a DSV of 5.9, a cis-1,4 content of 96.6 and an extractable content of 0.8%.

A sample of this polyisoprene was compounded in accordance with the formula set forth in Example IV and compared against natural rubber compounded in the identical manner as Example IV. Both the natural rubber and the polyisoprene were cured for 40 minutes at 275° F. The results obtained are set forth in the table below.

TABLE 9

|  | Natural Rubber Control | CS₂/Al 0.075/1 |
| --- | --- | --- |
| Ultimate Tensile | 4,900 | 4,320 |
| Elongation | 660 | 665 |
| 300% Modulus | 1,080 | 700 |
| Rebounds, Cold | 84.8 | 85.4 |
| Rebounds, Hot | 89.5 | 91.5 |
| Dynamic Modulus | 50.5 | 50.7 |
| Internal Friction | 6.0 | 5.4 |
| Dynamic Resilience | 75.1 | 77.3 |
| Heat Rise, Hx | 32 | 29.5 |
| Heat Rise, Hf | 56.5 | 51.5 |
| Percent Aged Tensile Retention | 71.7 | 79.4 |

EXAMPLE X

A five gallon polymerization was made according to the procedure of Example IV except that the Al/Ti mole ratio was 0.85/1, the amount of catalyst employed was 0.35 p.h.m. and the temperature was 15° C., the polymerization time was 20 hours and the CS₂/Al was 0.36/1. This polymerization resulted in a 61.5% conversion of a polyisoprene having a cis content of about 96%, a DSV of 9.6 with only about 0.3% extractables.

When this synthetic polyisoprene was compounded and cured as in the formula of Example IV and compared against natural rubber the following physical properties were obtained. The vulcanization was at 275° F. for 40 minutes.

TABLE 10

|  | Natural Rubber | Polyisoprene of Example IV |
| --- | --- | --- |
| Ultimate Tensile | 4,750 | 4,700 |
| Elongation | 950 |  |
| 300% Modulus | 950 | 925 |
| Hot Tensile (200° F.) | 85 | 87.2 |
| Rebounds, Cold | 88.4 | 91 |
| Rebounds, Hot | 50.7 | 57 |
| Dynamic Modulus | 6.7 | 5.2 |
| Internal Friction | 72.9 | 80.3 |
| Dynamic Resilience | 35.5 | 29 |
| Heat Rise, Hx | 61.5 | 40 |
| Heat Rise, Hf | 57.9 | 61.7 |
| Percent Aged Tensile Retention |  |  |

It can be seen from these examples that not only is the polymerization rate increased by the addition of small amounts of carbon disulfide to the prior art catalyst systems, but in many instances, the amount of extractables or non-desired cyclic polymers has been substantially reduced or completely eliminated. Furthermore, these examples illustrate that the cis 1,4 polyisoprene made in accordance with this invention exhibit physical properties which are superior to the rubber prepared in accordance with the prior art processes and also is superior to natural rubber. These improvements are particularly evident in regard to rebound, dynamic modulus, internal friction, dynamic resilience and in the heat rise values and, in at least one instance, in retention of aged tensile strength. Thus, it is believed that the improvement obtained by the addition of small amounts of carbon disulfide in accordance with the practice of this invention is a significant improvement over the prior art processes.

While certain representative embodiments and details have been shown for the purpose of illustrating this invention, it will be apparent to those skilled in the art that various changes and modifications may be made therein without departing from the spirit or scope of the invention.

What is claimed is:

1. The polymerization method which comprises polymerizing at least one conjugated diolefin by means of a catalyst system comprising (a) titanium tetrachloride (b) at least one member of the group consisting of (1) organo aluminum compounds defined by the formula

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyls), aryl and aralkyl radicals and (2) the aromatic etherates of organo aluminum compounds defined by the formula

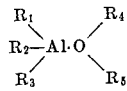

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyl), aryl, aralkyl radicals; $R_4$ is an aromatic radical and $R_5$ is selected from the group consisting of saturated aliphatic, unsaturated aliphatic, saturated alicyclic, unsaturated alicyclic and aromatic radicals and (c) carbon disulfide.

2. The polymerization method which comprises polymerizing at least one conjugated diolefin by means of a catalyst system comprising (a) titanium tetrachloride (b) at least one member of the group consisting of (1) organo aluminum compounds defined by the formula $$R_2 - \underset{R_3}{\overset{R_1}{Al}}$$

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyls), aryl and aralkyl radicals and (2) the aromatic etherates of organo aluminum compounds defined by the formula $$R_2 - \underset{R_3}{\overset{R_1}{Al}} \cdot O \underset{R_5}{\overset{R_4}{}}$$

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyl), aryl, aralkyl radicals; $R_4$ is an aromatic radical and $R_5$ is selected from the group consisting of saturated aliphatic, unsaturated aliphatic, saturated alicyclic, unsaturated alicyclic and aromatic radicals and (c) carbon disulfide, in which the molar ratio of carbon disulfide/aluminum is at least 0.01/1.

3. In the process of polymerizing conjugated diolefins by means of a catalyst comprising (a) titanium tetrachloride and (b) at least one member of the group consisting of (1) organo aluminum compounds defined by the formula $$R_2 - \underset{R_3}{\overset{R_1}{Al}}$$

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyls), aryl and aralkyl radicals and (2) the aromatic etherates of organo aluminum compounds, defined by the formula $$R_2 - \underset{R_3}{\overset{R_1}{Al}} \cdot O \underset{R_5}{\overset{R_4}{}}$$

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyl), aryl, aralkyl radicals; $R_4$ is an aromatic radical and $R_5$ is selected from the group consisting of saturated aliphatic, unsaturated aliphatic, saturated alicyclic, unsaturated alicyclic and aromatic radicals, the improvement comprising the addition to said polymerization system of small amounts of carbon disulfide.

4. The method according to claim 1 in which the conjugated diolefin is a 2-alkyl substituted butadiene.

5. The method according to claim 4 in which the 2-alkyl substituted butadiene is isoprene.

6. The method according to claim 1 in which the conjugated diolefin is butadiene.

7. The method according to claim 1 in which at least one conjugated diolefin is a mixture of butadiene and isoprene.

8. The method according to claim 1 in which the conjugated diolefin is isoprene and wherein the molar ratio of the aluminum/titanium in (a) and (b) is between about 0.7/1 to about 1.3/1.

9. The method according to claim 2 in which the conjugated diolefin is isoprene.

10. The method according to claim 2 wherein the carbon disulfide/aluminum mole ratio ranges from about 0.01/1 to about 0.6/1.

11. The method according to claim 20 wherein the aromatic etherate of organo aluminum compounds is an aromatic etherate of a trialkyl aluminum.

12. The method according to claim 11 wherein the aromatic etherate is phenyl etherate.

13. The method according to claim 11 wherein the aromatic etherate is anisolate.

14. The method according to claim 11 wherein the aromatic etherate of trialkyl aluminum is the anisolate of tri-n-propyl aluminum.

15. The method according to claim 11 wherein the aromatic etherate of trialkyl aluminum is the phenyl etherate of tri-n-propyl aluminum.

16. The method according to claim 11 wherein the aromatic etherate of trialkyl aluminum is the phenyl etherate of triisobutyl aluminum.

17. The method according to claim 11 in which the aromatic etherate of trialkyl aluminum is the anisolate of triisobutyl aluminum.

18. The method according to claim 2 wherein the aluminum and titanium portions of the catalyst are preformed separately.

19. The polymerization method which comprises polymerizing at least one conjugated diolefin by means of a catalyst system comprising (a) titanium tetrachloride, (b) organo aluminum compounds defined by the formula

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyls), aryl and aralkyl radicals, and (c) carbon disulfide.

20. The polymerization method which comprises polymerizing at least one conjugated diolefin by means of a catalyst system comprising (a) titanium tetrachloride, and (b) the aromatic etherates of organo aluminum compounds defined by the formula

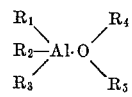

wherein $R_1$ is selected from the group consisting of alkyl (including cycloalkyls), aryl, aralkyl and halogen radicals and hydrogen; $R_2$ and $R_3$ are selected from the group consisting of alkyl (including cycloalkyl), aryl, aralkyl radicals; $R_4$ is an aromatic radical and $R_5$ is selected from the group consisting of saturated aliphatic, unsaturated aliphatic, saturated alicyclic, unsaturated alicyclic and aromatic radicals, and (c) carbon disulfide.

21. The method according to claim 19 in which the molar ratio of carbon disulfide/aluminum is at least 0.01/1.

22. The method according to claim 20 in which the molar ratio of carbon disulfide/aluminum is at least 0.01/1.

No references cited.

JOSEPH L. SCHOFER, *Primary Examiner.*

H. I. CANTOR, *Assistant Examiner.*